United States Patent
Chen et al.

(10) Patent No.: US 10,250,062 B2
(45) Date of Patent: Apr. 2, 2019

(54) ENERGY HARVESTING TIMER

(71) Applicant: HTC Corporation, Taoyuan County (TW)

(72) Inventors: Chien-Chih Chen, Taoyuan County (TW); Yen-Liang Kuo, Taoyuan County (TW); Chien-Ting Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 136 days.

(21) Appl. No.: 14/489,490

(22) Filed: Sep. 18, 2014

(65) Prior Publication Data

US 2016/0139565 A1 May 19, 2016

(51) Int. Cl.
*G04R 60/00* (2013.01)
*H02J 7/02* (2016.01)
*G04R 60/14* (2013.01)
*G04C 10/00* (2006.01)
*H02J 50/10* (2016.01)

(52) U.S. Cl.
CPC .............. *H02J 7/025* (2013.01); *G04C 10/00* (2013.01); *G04R 60/14* (2013.01); *H02J 50/10* (2016.02)

(58) Field of Classification Search
CPC ........ G04C 23/06; G04C 23/12; G04R 60/02; G04R 60/14
See application file for complete search history.

(56) References Cited

U.S. PATENT DOCUMENTS

| | | | | |
|---|---|---|---|---|
| 4,676,662 A * | 6/1987 | Sekido | .................... | G04C 10/02 368/205 |
| 5,130,956 A * | 7/1992 | Ueda | .................... | G04B 45/043 368/238 |
| 5,504,325 A * | 4/1996 | Talmon | .................... | G07F 17/12 109/56 |
| 6,608,464 B1 * | 8/2003 | Lew | .................... | B60K 1/04 320/101 |
| 8,081,032 B1 * | 12/2011 | Aram | .................... | H03F 1/26 330/305 |
| 8,791,358 B1 * | 7/2014 | Dutta | .................... | H01L 31/02021 136/255 |
| 9,141,089 B1 * | 9/2015 | Liou | .................... | G04R 60/14 |
| 2006/0055691 A1 * | 3/2006 | Bursett | .................... | G01S 1/047 345/211 |
| 2011/0164471 A1 * | 7/2011 | Baarman | .................... | H02J 7/025 368/10 |

(Continued)

FOREIGN PATENT DOCUMENTS

| | | |
|---|---|---|
| CN | 101359773 A | 2/2009 |
| CN | 203166635 U | 8/2013 |
| CN | 203275899 U | 11/2013 |

OTHER PUBLICATIONS

Corresponding Chinese Office Action dated Jun. 2, 2017.

*Primary Examiner* — Edwin A. Leon
*Assistant Examiner* — Jason M Collins
(74) *Attorney, Agent, or Firm* — CKC & Partners Co., LLC

(57) ABSTRACT

An energy harvesting timer includes a wireless charging module, a plurality of hands, and a driving module. The hands are connected to the wireless charging module. At least one of the hands serves as a receiving antenna of the wireless charging module. The driving module is connected to the wireless charging module and the hands, receiving energy from the wireless charging module to actuate the hands.

10 Claims, 3 Drawing Sheets

(56) References Cited

U.S. PATENT DOCUMENTS

| | | | |
|---|---|---|---|
| 2015/0185707 A1* | 7/2015 | Liou .................. | G04R 60/14 |
| | | | 368/47 |
| 2016/0091864 A1* | 3/2016 | Yang .................. | G04B 47/00 |
| | | | 368/12 |
| 2016/0094041 A1* | 3/2016 | Aioanei ............... | H02J 7/025 |
| | | | 307/104 |

* cited by examiner

ENERGY HARVESTING TIMER

BACKGROUND

Field of Invention

The present invention relates to an energy harvesting timer.

Description of Related Art

In the modern era, mechanical watches and quartz watches are primary types of watches utilizing hands. A mechanical watch is wound manually or automatically to generate driving power for the hands. The driving power stored in the clockworks may be exhausted if the clockwork is not wound for a period of time, which may cause a time error or cause the hands to stop working. A quartz watch needs a built-in battery to provide power. The watch has to be disassembled to replace the built-in battery if the battery is dead. Therefore both of the mechanical watch and the quartz watch must use artificial methods to maintain power to their respective clockworks.

SUMMARY

An aspect of the present invention is to provide an energy harvesting timer including a wireless charging module, a plurality of hands, and a driving module. The hands are connected to the wireless charging module. At least one of the hands serves as a receiving antenna of the wireless charging module. The driving module is connected to the wireless charging module and the hands. The driving module receives energy from the wireless charging module to actuate the hands.

In one or more embodiments, the wireless charging module includes a rectifier, a voltage converter, an energy storage device, and a power-management integrated circuit. The rectifier is configured to convert electromagnetic waves received by the receiving antenna into a direct current. The voltage converter is configured to adjust the voltage of the direct current. The power-management integrated circuit is connected to the power storage device, the voltage converter, and the driving module for transmitting the direct current to the power storage device and transmitting the energy of the energy storage device to the driving module.

In one or more embodiments, the energy harvesting timer further includes a wireless communication module connected to the wireless charging module. The wireless charging module provides energy to the wireless communication module.

In one or more embodiments, the energy harvesting timer further includes a switching module connected to the hands, the wireless communication module, and the wireless charging module. The switching module is configured to selectively connect one of the hands to the wireless communication module, and disconnecting the hand to the wireless charging module. The hand connected to the wireless communication module serves as a transmitting antenna of the wireless communication module.

In one or more embodiments, the wireless communication module includes a wireless communication chip and a matching circuit. The matching circuit is connected to the wireless communication chip and the switching module for matching an impedance between the wireless communication chip and the transmitting antenna.

In one or more embodiments, the wireless communication module is a Bluetooth module.

In one or more embodiments, the driving module is a mechanical gear set.

In one or more embodiments, the driving module includes a quartz oscillator, an integrated circuit, a stepper motor, and a gear set. The quartz oscillator is configured to provide a clock signal. The integrated circuit is connected to the quartz oscillator. The stepper motor is connected to the integrated circuit. The gear set is connected to the hands and the stepper motor. The integrated circuit actuates the stepper motor according to the clock signal, such that the stepper motor rotates the gear set.

In one or more embodiments, the hands have different lengths.

In one or more embodiments, the timer is a watch or a clock.

DETAILED DESCRIPTION

Figure 1:
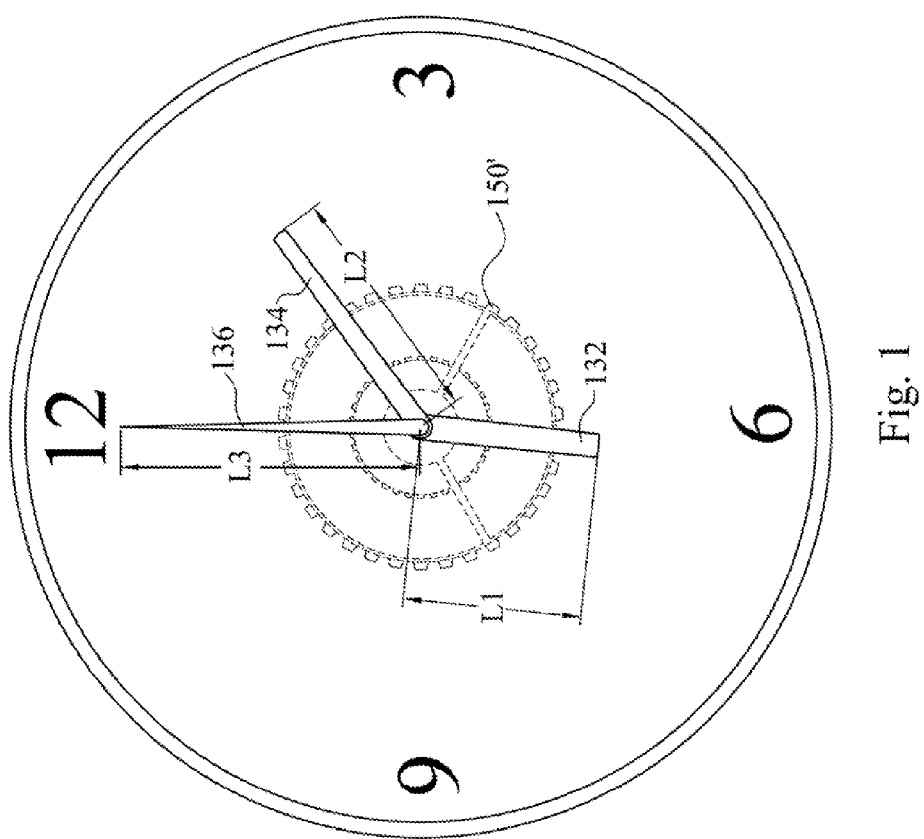
FIG. 1 is a front view of an energy harvesting timer according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
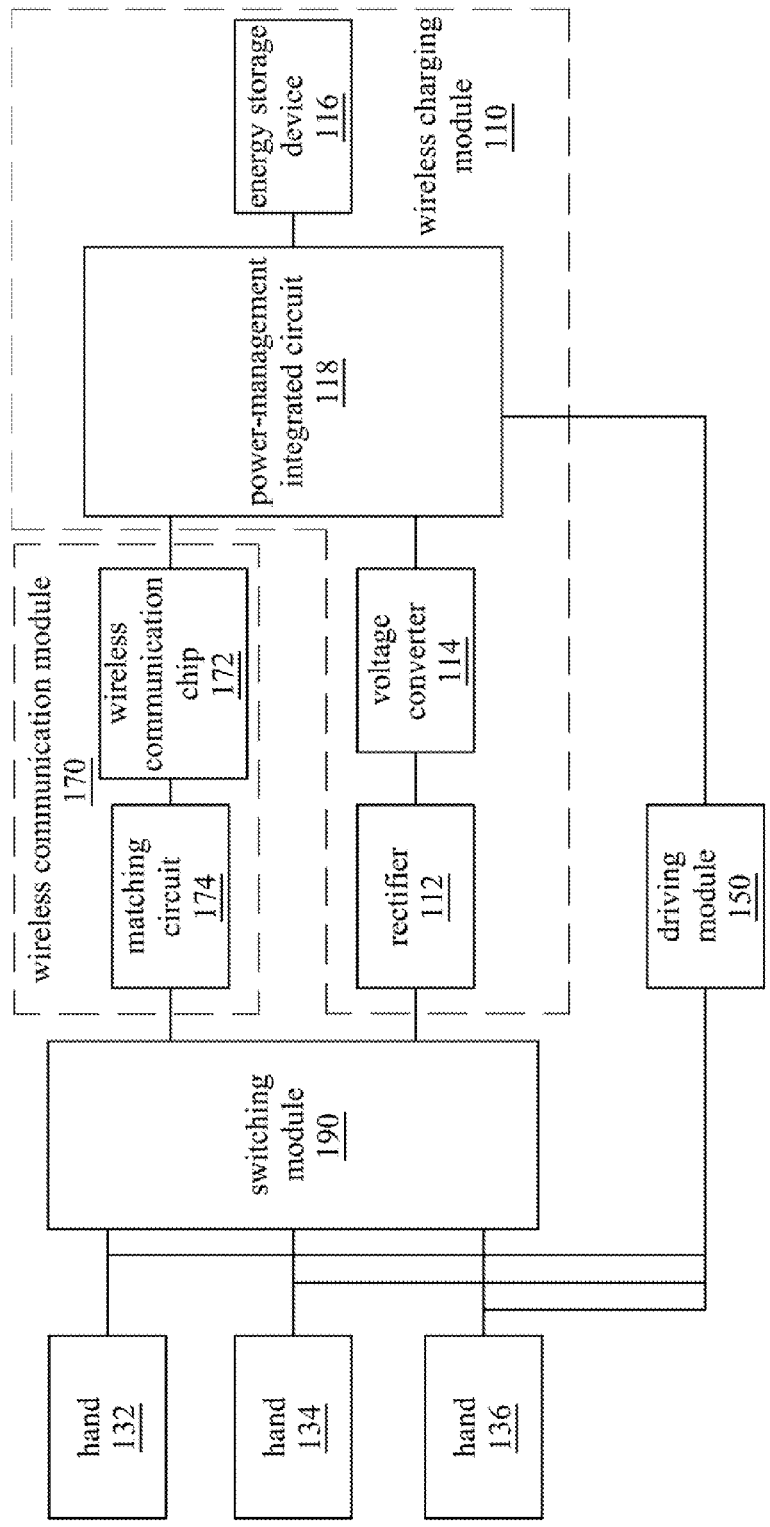
FIG. 2 is a functional block diagram of the energy harvesting timer of FIG. 1.

FIG. 1 is a front view of an energy harvesting timer according to one embodiment of the present invention, and FIG. 2 is a functional block diagram of the energy harvesting timer of FIG. 1. As shown in FIGS. 1 and 2, the energy harvesting timer (called timer hereinafter), such as an analog timer, includes a wireless charging module 110, a plurality of hands, and a driving module 150. For example, in FIGS. 1 and 2, the timer includes the hands 132, 134, and 136 connecting to the wireless charging module 110. At least one of the hands 132, 134, and 136 serves as a receiving antenna of the wireless charging module 110. The driving module 150 is connected to the wireless charging module 110 and the hands 132, 134, and 136. The driving module 150 receives energy from the wireless charging module 110 to actuate the hands 132, 134, and 136.

Briefly, the timer of the present invention proceeds wireless charging function with the receiving antenna served by the hands 132, 134, and 136 to provide driving power to the hands 132, 134, and 136 of the timer. More specifically, contributing to the development of the wireless communication technology, electromagnetic waves of base stations and wireless Internet access points (WiFi AP) normally exist all around us in our daily environment. Through the coupling between the hands 132, 134, and 136 and the electromagnetic wave, the hands 132, 134, and 136 can transmit the energy of the electromagnetic waves to the wireless charging module 110. The wireless charging module 110 can transmit the received energy to the driving module 150 to actuate the hands 132, 134, and 136. Therefore, the timer of the present invention can maintain its power without replacing batteries or winding the clockwork manually to provide sufficient power of the hands 132, 134, and 136. Also, it can overcome the disadvantage of the conventional ecology-drive watches that only actuating while being worn.

In this embodiment, the timer can be a watch or a clock. That is, the hand 132 is an hour hand, the hand 134 is a minute hand and the hand 136 is a second hand. However, in other embodiments, the number of the hands can be different according to the dial designs. For example, the timer can only include an hour hand and a minute hand, or can be a timing system including multi-sets of hands to provide times in different time zones. All of the hands 132, 134, and 136 can be made from metal to improve receiving efficiencies of electromagnetic waves.

Since the lengths of the hands 132, 134, and 136 determine the frequencies of receiving electromagnetic waves, in this embodiment, the hands 132, 134, and 136 can have different lengths to increase types of receiving electromagnetic waves. For example, the length L1 of the hand 132 is about 1.5 cm, the length L2 of the hand 134 is about 2.1 cm, and the length L3 of the hand 136 is about 2.4 cm. Hence, the coupling frequency of the hand 132 and electromagnetic waves is about 2.4 GHz, which is a communication frequency for Bluetooth and WiFi. The coupling frequency of the hand 134 and electromagnetic waves is about 1910~2170 MHz, which is a communication frequency for the 3G Internet system. The coupling frequency of the hand 136 and electromagnetic waves is about 900 MHz, which is a communication frequency for Global System for Mobile Communications (GSM). However, in other embodiments, the lengths L1, L2, and L3 of the hands 132, 134, and 136 can be designed according to real requirements, and the claimed scope is not limited in this respect.

In this embodiment, the wireless charging module 110 includes a rectifier 112, a voltage converter 114, an energy storage device 116, and a power-management integrated circuit 118. The rectifier 112 is configured to convert electromagnetic waves received by the receiving antenna (i.e., the hands 132, 134, and 136) into a direct current. The voltage converter 114 is configured to adjust the voltage of the direct current. The power-management integrated circuit 118 is connected to the power storage device 116, the voltage converter 114, and the driving module 150 for transmitting the direct current to the power storage device 116 and transmitting the energy of the energy storage device 116 to the driving module 150.

In greater detail, when the hands 132, 134, and 136 couple with the electromagnetic waves, the rectifier 112 converts the energy of the electromagnetic waves into a direct current. Subsequently, the voltage converter 114 adjusts the voltage of the direct current to a suitable voltage of the energy storage device 116 and enters the power-management integrated circuit 118. The power-management integrated circuit 118 transmits the direct current to the energy storage device 116. Hence, the charging process of the wireless charging module 110 is complete.

Moreover, when the energy storage device 116 approaches saturation, the input impedance of the power-management integrated circuit 118 is gradually increased, such that the current flowing from the voltage converter 114 to the power-management integrated circuit 118 is gradually decreased. When the energy storage device 116 is fully charged, the input impedance of the power-management integrated circuit 118 is open, making the current of the voltage converter 114 stop flowing. Hence, the captured electromagnetic waves are no longer to be converted into electric energy to protect the wireless charging module 110.

In one or more embodiment, the energy stored by the wireless charging module 110 is not only configured to actuate the hands 132, 134, and 136, but also configured to provide energy to other energy-required elements of the timer. For example, the wireless charging module 110 can provide energy to an alarm, to a biological sensing element, or to an information-transmitting element. Taking the information-transmitting element as an example, the timer can further include a wireless communication module 170 connected to the wireless charging module 110, more specifically, connected to the power-management integrated circuit 118 of the wireless charging module 110. The wireless charging module 110 provides energy to the wireless communication module 170. In other words, the energy stored in the wireless charging module 110 can be provided to the wireless communication module 170 to proceed communication applications. Such a configuration can be applied to home appliance intranets among the timer and other home appliances.

In one or more embodiments, the hands 132, 134, and 136 can be transmitting antennas of the wireless communication module 170. More specifically, the timer can further include a switching module 190 connected to the hands 132, 134, 136, the wireless communication module 170, and the wireless charging module 110. The switching module 190 is configured to selectively connect one of the hands (i.e. the hand 132 in this embodiment, and it can be another hands in other embodiments) to the wireless communication module 170, and disconnecting the hand 132 to the wireless charging module 110. Therefore, the hand 132 connected to the wireless communication module 170 serves as a transmitting antenna of the wireless communication module 170.

In greater detail, the switching module 190 can be a 3 pole 2 throw (3P2T) switch. The switching module 190 switches all of the hands 132, 134, and 136 to the wireless charging module 110 when the timer is proceeding wireless charging. When the timer needs to wireless communicate, the switching module 190 connects one of the hands (the hand 132 in this embodiment) to the wireless communication module 170, and disconnects the hand 132 to the wireless charging module 110 while both of the hands 134 and 136 are still connected to the wireless charging module 110. In other words, the hand 132 is configured to be the transmitting antenna of the wireless communication module 170 while the hands 134 and 136 are configured to be the receiving antennas of the wireless charging module 110. Hence, the timer can simultaneously utilize the wireless charging function and the wireless communication function.

In this embodiment, the wireless communication module 170 includes a wireless communication chip 172 and a matching circuit 174. The matching circuit 174 is connected to the wireless communication chip 172 and the switching module 190 for matching the impedance between the wireless communication chip 172 and the transmitting antenna (i.e., the hand 132 in this embodiment), improving the coupling between the hand 132 and the wireless communication chip 172. The wireless communication chip 172 is configured to proceed the wireless communication process.

In this embodiment, the wireless communication module 170 can be a bluetooth module, whose transmitting antenna corresponds to the hand 132. Normally, the switching module 190 connects the hands 132, 134, and 136 to the wireless charging module 110. When the timer intends to request the position signal (such as Beacon), the switching module 190 connects the hand 132 to the wireless communication module 170 for a short period so as to send out the signal. Further, when the wireless communication module 170 of the wireless communication chip 172 intends to send out the instructions of communication or transmission, the switching module 190 can connect the hand 132 to the wireless communication module 170 for a longer period, and the connection period is over when the communication or the transmission process is finished. The wireless communication module 170 can be GPS module, etc.

The following paragraphs give an example about wireless charging efficiency, and a WiFi is taken as an instance of a charging source herein. Table 1 is powers of the timer received from a 1W WiFi AR From Table 1 the received power was about 314 µW when the antenna gain of the WiFi AP was 19 dBi and the WiFi AP was at a distance from the timer of about 5 m.

TABLE 1 powers of the timer received from a 1 W WiFi AP

| Antenna Gain | Distance | Received Power |
|---|---|---|
| 16 dBi | 5 m | 157 µW |
| 16 dBi | 10 m | 39 µW |
| 19 dBi | 5 m | 314 µW |
| 19 dBi | 10 m | 78 µW |

Moreover, from the system power consumption point of view, the average consumption current of a Bluetooth Low Energy (BTE) device is about 60~80 µA, which is corresponding to about 240 µW (cited from Broadcom BCM20715 datasheet), and the average consumption power of a general quartz watch is about 1~4 µW. When the charging power of the timer is higher than the consumption power (for example, when the wireless communication function is off), the extra energy can be stored in the energy storage device 116.

In this embodiment, the driving module 150 is a mechanical gear set 150' as shown in FIG. 1. The components of the mechanical gear set 150' in FIG. 1 is illustrative only and should not limit the claimed scope of the present invention. More specifically, the power-management integrated circuit 118 transmits the energy of the energy storage device 116 to the mechanical gear set 150' to actuate the mechanical gear set 150', which then drives the hands 132, 134, and 136.

Figure 3:
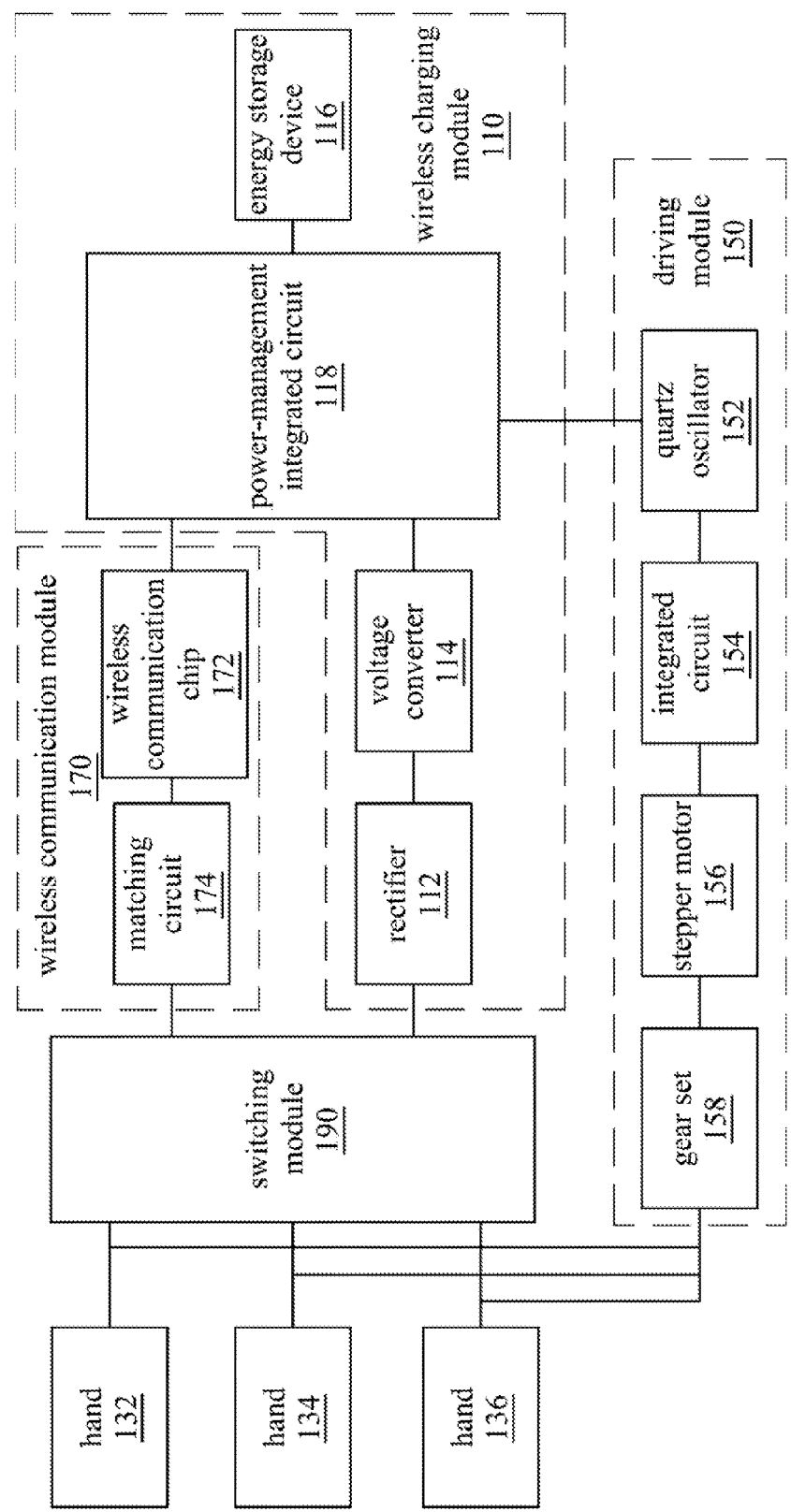
FIG. 3 is a functional block diagram of an energy harvesting timer according to another embodiment of the present invention.

However, the structure of the driving module 150 is not limited in this respect. FIG. 3 is a functional block diagram of the energy harvesting timer according to another embodiment of the present invention. In this embodiment, the driving module 150 includes a quartz oscillator 152, an integrated circuit 154, a stepper motor 156, and a gear set 158. The quartz oscillator 152 is configured to provide a clock signal. The integrated circuit 154 is connected to the quartz oscillator 152. The stepper motor 156 is connected to the integrated circuit 154. The gear set 158 is connected to the hands 132, 134, 136 and the stepper motor 156. The integrated circuit 154 actuates the stepper motor 156 according to the clock signal, such that the stepper motor 156 rotates the gear set 158. The power-management integrated circuit 118 provides energy to the quartz oscillator 152, the integrated circuit 154, and the stepper motor 156, such that the stepper motor 156 can drive the hands 132, 134, and 136 through the gear set 158.

In summary, the timer of aforementioned embodiments proceeds wireless charging function with the receiving antenna, which is served by the hands, to provide the driving power for the hands of the timer. Therefore, the timer can maintain its power without replacing the batteries or winding the clockwork manually to provide sufficient power of the hands. Also, it can overcome the disadvantage of the conventional ecology-drive watches that only actuate while being worn. Furthermore, the timer can further include the wireless communication module, which can capture the energy collected by the wireless charging module to proceed wireless communication or transmission works. Moreover, the hands can serve as the transmission antenna of the wireless communication module, saving the element space and lowering the element costs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An energy harvesting timer, comprising:
   a wireless charging module configured to process a radio frequency existing in environment;
   a wireless communication module connected to the wireless charging module, wherein the wireless charging module provides energy to the wireless communication module;
   a plurality of hands selectively coupled to the wireless charging module or the wireless communication module, wherein while at least one of the hands is coupled to the wireless communication module to be a transmitting antenna to perform a wireless communication function, the other hands are still coupled to the wireless charging module to be receiving antennas to perform wireless charging function, wherein a length of the receiving antenna is substantially the length of the hand; and
   a driving module electrically connected to the wireless charging module and at least one of the hands, wherein the driving module receives energy from the wireless charging module to actuate at least one of the hands.

2. The energy harvesting timer of claim 1, wherein the wireless charging module comprises:
   a rectifier for converting electromagnetic waves received by the receiving antenna into a direct current;
   a voltage converter for adjusting the voltage of the direct current;
   an energy storage device; and
   a power-management integrated circuit connected to the power storage device, the voltage converter, and the driving module for transmitting the direct current to the power storage device and transmitting the energy of the energy storage device to the driving module.

3. The energy harvesting timer of claim 1, further comprising:
   a switching module connected to the hands, the wireless communication module, and the wireless charging module, wherein the switching module is configured to selectively connect one of the hands to the wireless communication module, and disconnect the hand to the wireless charging module, the hand connected to the wireless communication module serves as the transmitting antenna of the wireless communication module.

4. The energy harvesting timer of claim 3, wherein the wireless communication module comprises:
   a wireless communication chip; and
   a matching circuit connected to the wireless communication chip and the switching module for matching an impedance between the wireless communication chip and the transmitting antenna.

5. The energy harvesting timer of claim 1, wherein the wireless communication module is a bluetooth module.

6. The energy harvesting timer of claim 1, wherein the driving module is a mechanical gear set.

7. The energy harvesting timer of claim 1, wherein the driving module comprises:
   a quartz oscillator for providing a clock signal;
   an integrated circuit connected to the quartz oscillator;
   a stepper motor connected to the integrated circuit; and
   a gear set connected to the hands and the stepper motor, wherein the integrated circuit actuates the stepper motor according to the clock signal, such that the stepper motor rotates the gear set.

8. The energy harvesting timer of claim 1, wherein the hands have different lengths.

9. The energy harvesting timer of claim 1, wherein the timer is a watch or a clock.

10. An energy harvesting timer, comprising:
   a wireless charging module configured to process at least a first radio frequency and a second radio frequency existing in environment to generate an energy;
   a first hand and a second hand electrically connected to the wireless charging module, wherein the first hand serves as a first receiving antenna of the wireless charging module, the second hand serves as a second receiving antenna of the wireless charging module, the first hand has a length that results in the first hand coupling with the first radio frequency, the second hand has a length that results in the second hand coupling with the second radio frequency, and the length of the first hand and the first radio frequency are different respectively from the length of the second hand and the second radio frequency;
   a driving module electrically connected to the wireless charging module and the hands, wherein the driving module receives the energy from the wireless charging module to actuate at least one of the hands;
   a wireless communication module electrically connected to the wireless charging module, wherein the wireless charging module provides the energy also to the wireless communication module; and
   a switching module electrically coupled to the hands, the wireless communication module, and the wireless charging module, wherein the switching module is configured to selectively electrically disconnect the first hand from the wireless charging module and electrically connect the first hand to the wireless communication module, wherein while the first hand electrically connected to the wireless communication module serves as a transmitting antenna of the wireless communication module, and the second hand still electrically connected to the wireless charging module serves as the second receiving antenna of the wireless charging module.

\* \* \* \* \*